(12) United States Patent
Minty et al.

(10) Patent No.: US 8,042,693 B2
(45) Date of Patent: Oct. 25, 2011

(54) WATER SCAVENGING SYSTEM

(75) Inventors: Andrew Minty, Bristol (GB); Barry Miles, Bristol (GB)

(73) Assignee: Airbus Operations Limited, Bristol (GB)

( * ) Notice: Subject to any disclaimer, the term of this patent is extended or adjusted under 35 U.S.C. 154(b) by 380 days.

(21) Appl. No.: 12/444,689

(22) PCT Filed: Nov. 12, 2007

(86) PCT No.: PCT/GB2007/050685
§ 371 (c)(1),
(2), (4) Date: Apr. 8, 2009

(87) PCT Pub. No.: WO2008/059287
PCT Pub. Date: May 22, 2008

(65) Prior Publication Data
US 2010/0006048 A1    Jan. 14, 2010

(30) Foreign Application Priority Data
Nov. 13, 2006  (GB) .................................. 0622565.0

(51) Int. Cl.
*B64D 37/34* (2006.01)
(52) U.S. Cl. ................. 210/416.4; 244/135 R
(58) Field of Classification Search ............... 210/416.4; 244/135 R
See application file for complete search history.

(56) References Cited

U.S. PATENT DOCUMENTS

| | | | |
|---|---|---|---|
| 4,031,864 A | 6/1977 | Crothers | |
| 4,809,934 A | 3/1989 | Rix | |
| 5,123,810 A | 6/1992 | Hansen | |
| 5,771,848 A | 6/1998 | Bastenhof | |
| 6,170,470 B1 | 1/2001 | Clarkson et al. | |

FOREIGN PATENT DOCUMENTS

| | | |
|---|---|---|
| EP | 0278755 A2 | 8/1988 |
| GB | 106491 | 5/1919 |
| GB | 1132751 | 11/1968 |
| GB | 2260579 A | 4/1993 |
| JP | 57091358 A | 6/1982 |
| JP | 6173777 A | 12/1992 |
| JP | 6294353 A | 4/1993 |
| WO | 98/13596 A1 | 4/1998 |

OTHER PUBLICATIONS

ISR and Written Opinion for PCT/GB2007/050685 mailed Feb. 28, 2008.
British Search Report for GB0622565.0 dated Mar. 13, 2007.

*Primary Examiner* — David A Reifsnyder
(74) *Attorney, Agent, or Firm* — Lowe, Hauptman, Ham & Berner, LLP

(57) ABSTRACT

A fuel system comprising: a fuel line coupled to an engine; a fuel pump having an inlet coupled to a fuel tank and an outlet coupled to the fuel line; and a water scavenging system having an inlet for collecting water and an outlet coupled to the fuel line in parallel with the pump. The water scavenging system is powered by the hydraulic action of fuel in the fuel line using for example a venturi arrangement or a motor/pump combination.

12 Claims, 8 Drawing Sheets

WATER SCAVENGING SYSTEM

RELATED APPLICATIONS

The present application is based on International Application Number PCT/GB2007/050685 filed Nov. 12, 2007, and claims priority from British Application Number 0622565.0 filed Nov. 13, 2006, the disclosures of which are hereby incorporated by reference herein in their entirety.

FIELD OF THE INVENTION

The present invention relates to a method and apparatus for removing water from a fuel tank.

BACKGROUND OF THE INVENTION

U.S. Pat. No. 4,809,934 describes a system for on-board disposal of water in aircraft fuel tanks. Water is drawn into a jet pump and dispersed into a fuel tank for consumption by the aircraft engines. A problem with the arrangement of U.S. Pat. No. 4,809,934 is that the water will only be fully removed when the fuel tank is empty. Also, the water dispersed in the fuel tank may create "snow" or cause icing in the tank at lower temperatures.

SUMMARY OF THE INVENTION

A first aspect of the invention provides a fuel system comprising: a fuel line; a fuel pump having an inlet coupled to a fuel tank and an outlet coupled to the fuel line; and a water scavenging system having an inlet for collecting water from the fuel tank and an outlet coupled to the fuel line in parallel with the pump.

A second aspect of the invention provides a method of removing water from a fuel tank, the method comprising scavenging the water from the fuel tank; injecting it into a fuel line downstream of a fuel pump; and feeding it from the fuel line into an engine.

By injecting the water directly into the fuel line (instead of dispersing it in the fuel tank) the problems identified above are removed or at least reduced.

The water scavenging system may be powered electrically, but more preferably is powered by the hydraulic action of fuel in the fuel line using for example a venturi arrangement or a motor/pump combination.

BRIEF DESCRIPTION OF THE DRAWINGS

Embodiments of the invention will now be described with reference to the accompanying drawings, in which:

FIG. 8b shows a section through part of the system of FIG. 8a.

DETAILED DESCRIPTION OF EMBODIMENTS

Figure 1:
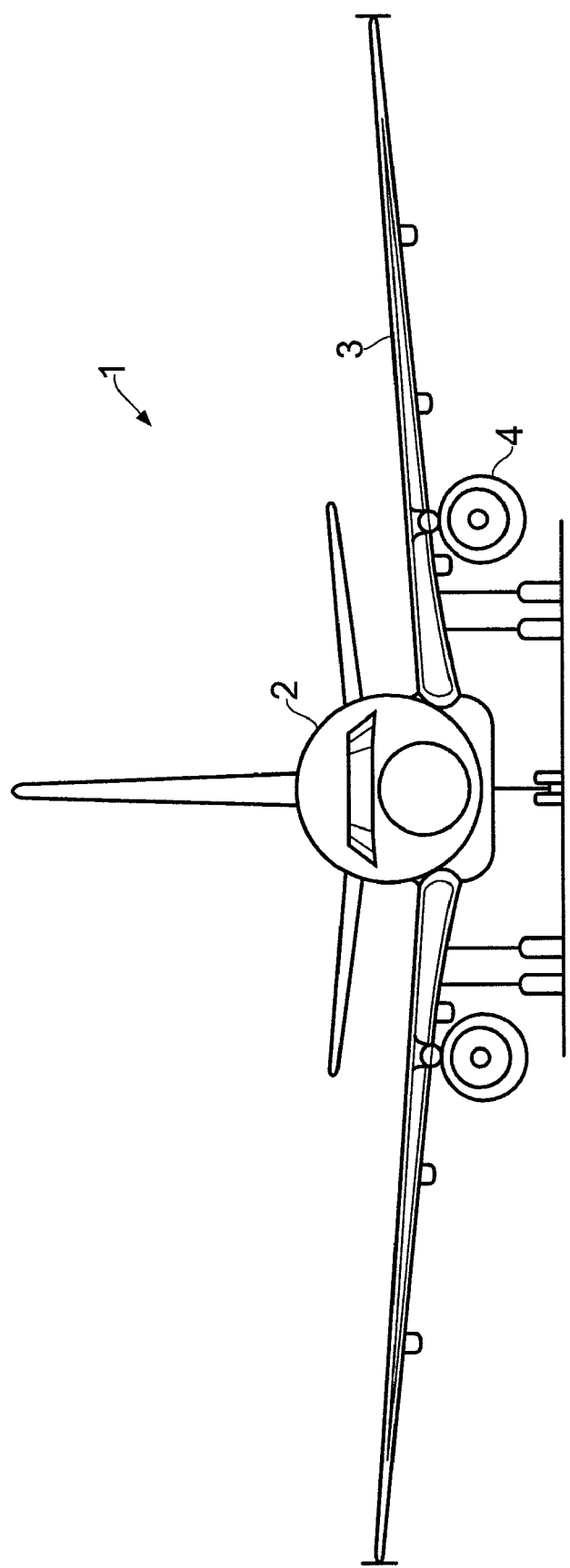
FIG. 1 shows an aircraft.

Referring to FIG. 1, an aircraft 1 comprises a fuselage 2 carrying a pair of wings, the left wing being labelled 3. Each wing carries an engine, the left hand engine being labelled 4 in FIG. 1. The engine includes a high pressure fuel pump (not shown) which requires a minimum inlet pressure, typically of the order of 5-10 psig.

Fuel for each engine is stored in a centre tank and one or more wing tanks. In the example given below, only a single wing tank is described, but in practice there are additional wing tanks.

Figure 2:
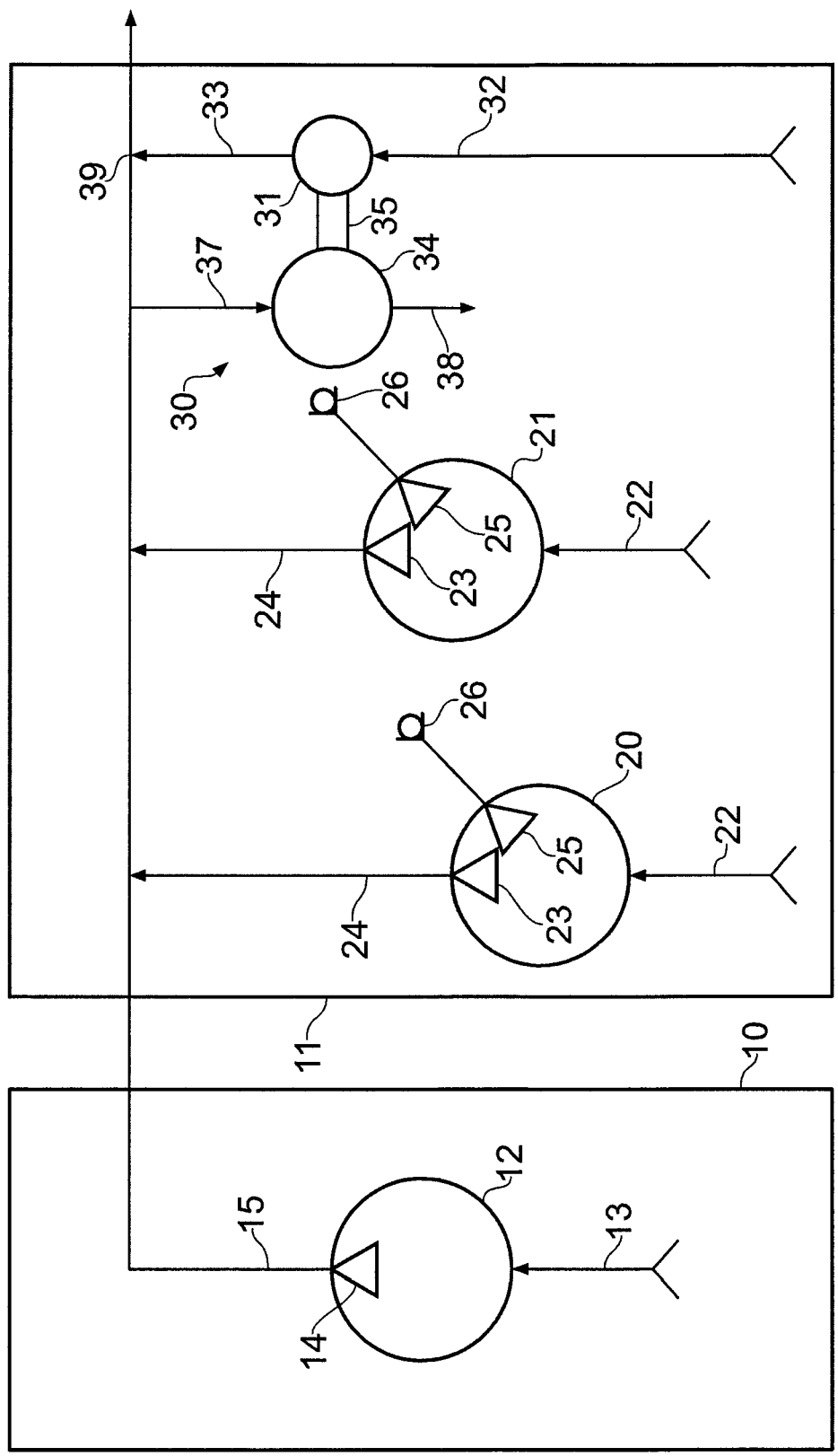
FIG. 2 shows part of the fuel system of the aircraft.

FIG. 2 is a schematic diagram showing the centre tank 10 and a wing tank 11 for the left hand wing 3.

The centre tank 10 has a fuel pump 12 having an inlet 13 for collecting fuel from the tank 10, and an outlet 14 that incorporates a non return valve to prevent flow back into the pump, coupled in series to a fuel line 15 which leads to the engine 4.

The wing tank 11 comprises a pair of fuel pumps 20, 21 which are identical in construction (and are also identical to the fuel pump 12) so the same reference numerals will be used for equivalent parts. Each fuel pump 20, 21 comprises an inlet 22 for collecting fuel from the tank, and a main outlet 23 which incorporates a non return valve to prevent flow back into the pump, this is coupled in series to a feed line 24. The feed line 24 is coupled in turn to the fuel line 15 in parallel with the pump 12 in the centre tank 10. Each pump 20, 21 also has a second outlet 25 which is coupled to the inlet 22 in parallel with the main outlet and non-return valve 23. The second outlet 25 leads to a pressure relief valve 26 that opens to re-circulate fuel into the fuel tank when the fuel pressure exceeds 24 psig. The valve 26 comprises a spring-loaded member which engages a valve seat and opens against the spring force when the pressure exceeds 24 psig. Thus the pressure point at which the valve opens can be adjusted by adjusting the degree of compression of the spring.

Two pumps 20, 21 are provided in the wing tank for redundancy purposes. That is, if one of the pumps malfunctions, then the other pump alone is capable of providing the fuel rate required at take off.

The tanks are operated in sequence as follows.
1. The centre tank is only used if the flight is longer than approximately 2 hours. If it is not used the tank is empty and the pumps are not switched on as all fuel is supplied from the wing tanks.
2. When the engines are started before take off, the centre tank pump 12 and the wing tank pumps 20, 21 are operating. The fuel supply pressure from the centre tank pump 12 is approximately 40 psig which causes the relief valves 26 to automatically fully open to "de-rate" the wing tank pumps 20, 21. That is, with the centre tank pump operational the relief valves 26 open and flow from the centre tank takes precedence over flow from the wing tank as the wing pumps 20, 21 merely re-circulate fuel into the wing tank 11. The non-return valves 23 prevent any of the higher pressure fuel from the centre tank from flowing into the wing tanks.
3. At take off the centre tank pump 12 is switched off, the relief valves 26 close automatically in response to the drop in pressure, and all fuel is supplied from the wing tanks. A short time after take off the centre tank pump 12 is switched on and the relief valves 26 open again to allow full recirculation in the wing tanks so that the engines are supplied exclusively from the centre tank When the centre tank is empty the pressure in the fuel line 15 drops, causing the relief valves 26 to close automatically. The fuel supply then continues from the wing tank, and the centre tank pump 12 is switched off again.

A problem with the re-circulating pumps 20, 21 is that any water fed into the pump inlet will be atomised and redistributed into the tank 11 creating "snow" or causing icing in the tank at lower temperatures seen at altitude. Once the aircraft is at cruise altitude the external temperature is very low and the tank temperature will cool to less than the freezing point of water in approximately 30 minutes. After the water has frozen it is not possible to remove any water from the tank until the aircraft thaws.

A water scavenging system 30 shown in FIG. 2 collects water from the sump of the wing tank 11 and injects it into the fuel line 15 at a junction 39 downstream of the pumps 12, 20, and 21. This prevents the water being recirculated into the fuel tank, and potentially causing the "snow" or icing problems described above. The water scavenging system 30 comprises a pump 31 having an inlet 32 for collecting water from the sump of the wing tank, and an outlet 33 coupled to the fuel line 15 in parallel with the pumps 12, 20 and 21. The pump 31 is driven by a motor 34 having a power output shaft 35 mechanically coupled to an input shaft of the water scavenging pump 31. The motor 34 has a fluid inlet 37 coupled to the fuel line 15 via a two-way junction, and a fluid outlet 38 which opens into the fuel tank 11. The motor 34 is driven by the hydraulic action of fuel drawn from the fuel line 15 as shown in further detail in FIG. 3.

Figure 3:
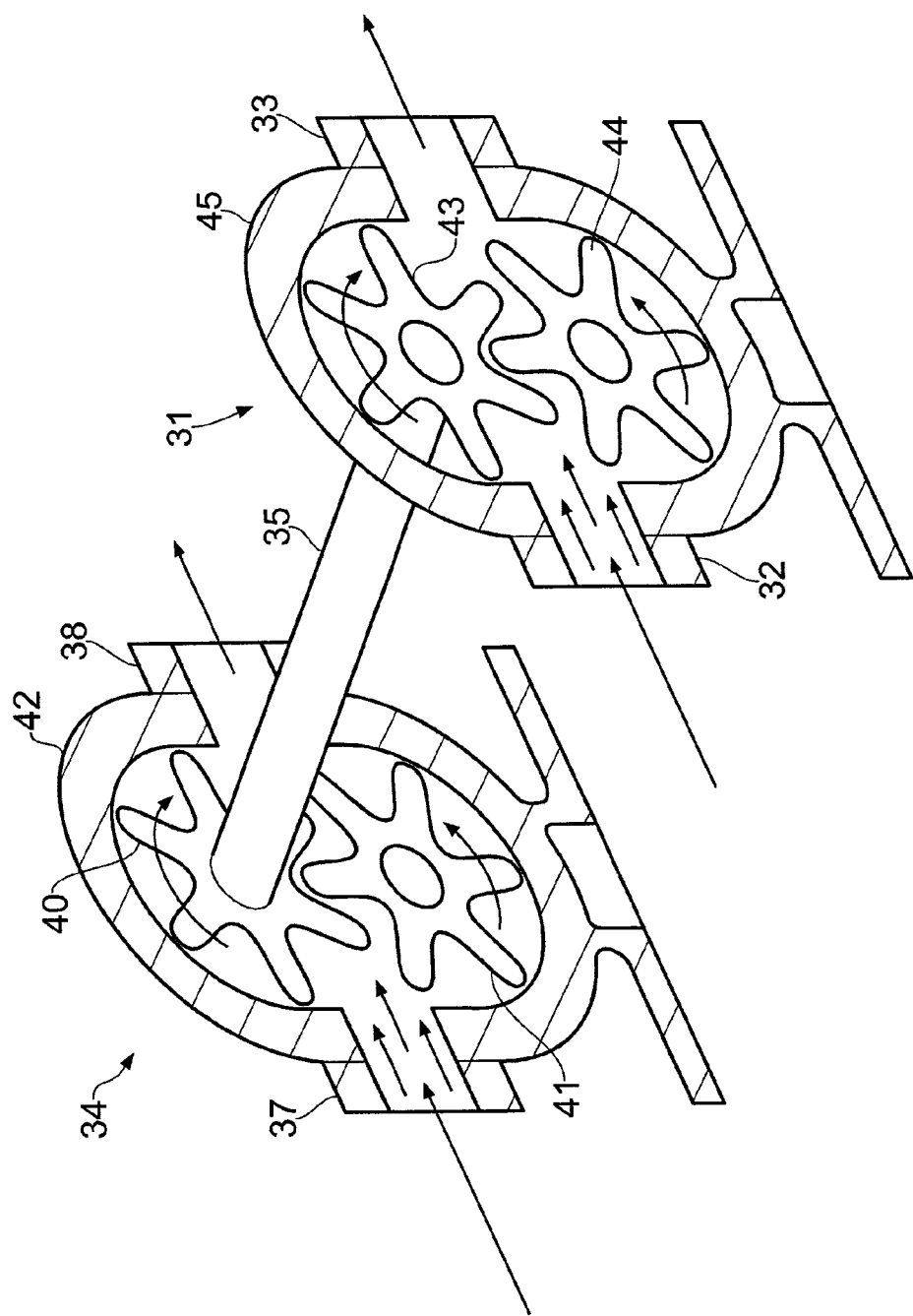
FIG. 3 is a detailed view of the motor and water-scavenging pump.

As shown in FIG. 3, the motor comprises a pair of meshed gears (rotor gear 40 and idler gear 41) in a chamber 42 shown in cross-section. Fluid flowing into the inlet 37 flows around the periphery of the chamber 42 and out of the outlet 38, causing the gears 40, 41 to counter-rotate as shown. The output shaft 35 is connected to the rotor gear 40 and a gear 43 of the pump 31. The gear 43 meshes with a gear 44 in a chamber 45. Rotation of the gear 43 causes the gear 44 to counter-rotate as shown, drawing a water/fuel mixture from the inlet 32 around the periphery of the chamber 45 and out of the outlet 33.

The ratio of pump outlet pressure to motor supply pressure is very important as the pump 31 has to achieve a slightly higher pressure than the motor supply pressure (typically 2-5 psi greater) as it has to inject the water/fuel scavenge flow back into the high pressure fuel line 15. The junction 39 includes a narrow orifice which causes the water/fuel mixture to be injected into the fuel line 15 as a fine spray.

Making the volume of fluid displaced by the motor 34 larger than the volume displaced by the pump 31 causes the pump outlet pressure to be higher than the motor supply pressure. This can be achieved by increasing the diameter of the motor gears 40,41, and/or by increasing the axial length of the motor gears 40,41 relative to the pump gears 40,43. If (for example) the axial length is twice as large, then if the motor and pump were 100% efficient the pump pressure would be twice the motor pressure and the flow would be halved. Due to inefficiencies of friction and leakage the pump pressure is approximately 1.5 times the motor supply pressure.

Thus the ratio between the motor gears and the pump gears is fine tuned to give a desired ratio between the pump outlet pressure and the motor supply pressure.

The advantages of using the gear motor 34 and pump 31 is that they are both positive displacement devices (for each rotation of the shaft 35 a fixed volume of fluid is moved), it is easy to fix the ratio of motor pressure to pump pressure, they are very simple, have a low number of parts, and operate at relatively low speeds of 1000 to 3000 rpm giving long life.

Another important characteristic of the motor/pump combination is that it is capable of self-starting. This enables the operation to be entirely automatic, and as a result no electrical power or data lines need to be routed into the fuel tank for the water scavenging system 30.

In a series of alternative embodiments, the motor-driven water scavenging system 30 is replaced by a venturi-driven water scavenging system. Various alternative venturi-driven water scavenging systems are shown in FIGS. 4 to 8.

Figure 4:
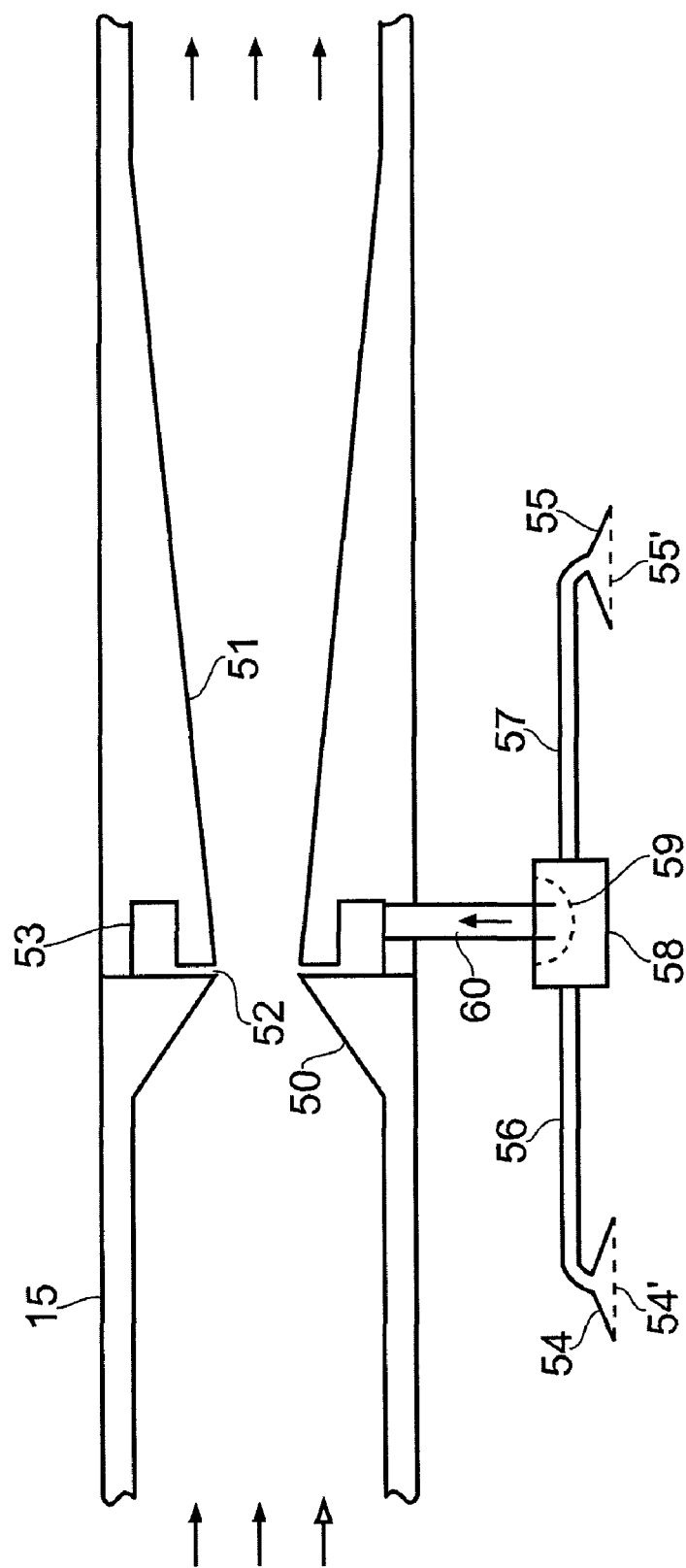
FIG. 4 shows a venturi system with a single venturi with throat tapping.

Referring to FIG. 4, a venturi is formed in the fuel line 15. The venturi has steep frustoconical inlet walls 50 and shallow frustoconical outlet walls 51. An annular slot 52 is positioned at the throat of the venturi (that is, at its narrowest point). The slot 52 leads to an annular chamber 53. A pair of suction inlets 54,55 are positioned at the sump of the wing tank 11, and have filters 54',55'. Feed lines 56,57 lead from the inlets 54,55 to a chamber 58 with a strainer/trap 59. A feed line 60 leads from the chamber 58 into the annular chamber 53.

The venturi draws the water/fuel mixture through the line 60, and the water is dispersed into the fuel in the fuel line 15. The pressure (P1) in the fuel line upstream of the venturi is typically of the order of 40 psig when the main tank fuel pump 12 is operating, and 24 psig when the main tank fuel pump 12 is turned off. The engine fuel flow (Q1) in the line 15 upstream of the venturi may range from 0.2 litres per second (when the aircraft is cruising) to 2.2 litres per second (when the aircraft is taking off). The pressure (P2) at the throat of the venturi needs to be at or slightly below the pressure in the wing tank 11 (approximately 0 psig) in order to suck the water/fuel mixture into the fuel line. The pressure (P3) in the fuel line downstream of the venturi is typically of the order of 10% lower than P1. Thus the pressure drop (P1–P2) coming into the venturi, and the pressure rise (P3–P2) coming out of the venturi must be of the order of P1. In order to achieve such a large pressure change, the diameter of the venturi must reduce from approximately 38 mm to a throat diameter of the order of 6-7 mm. Such a small diameter may be susceptible to blockage by particles or ice.

Figure 5:
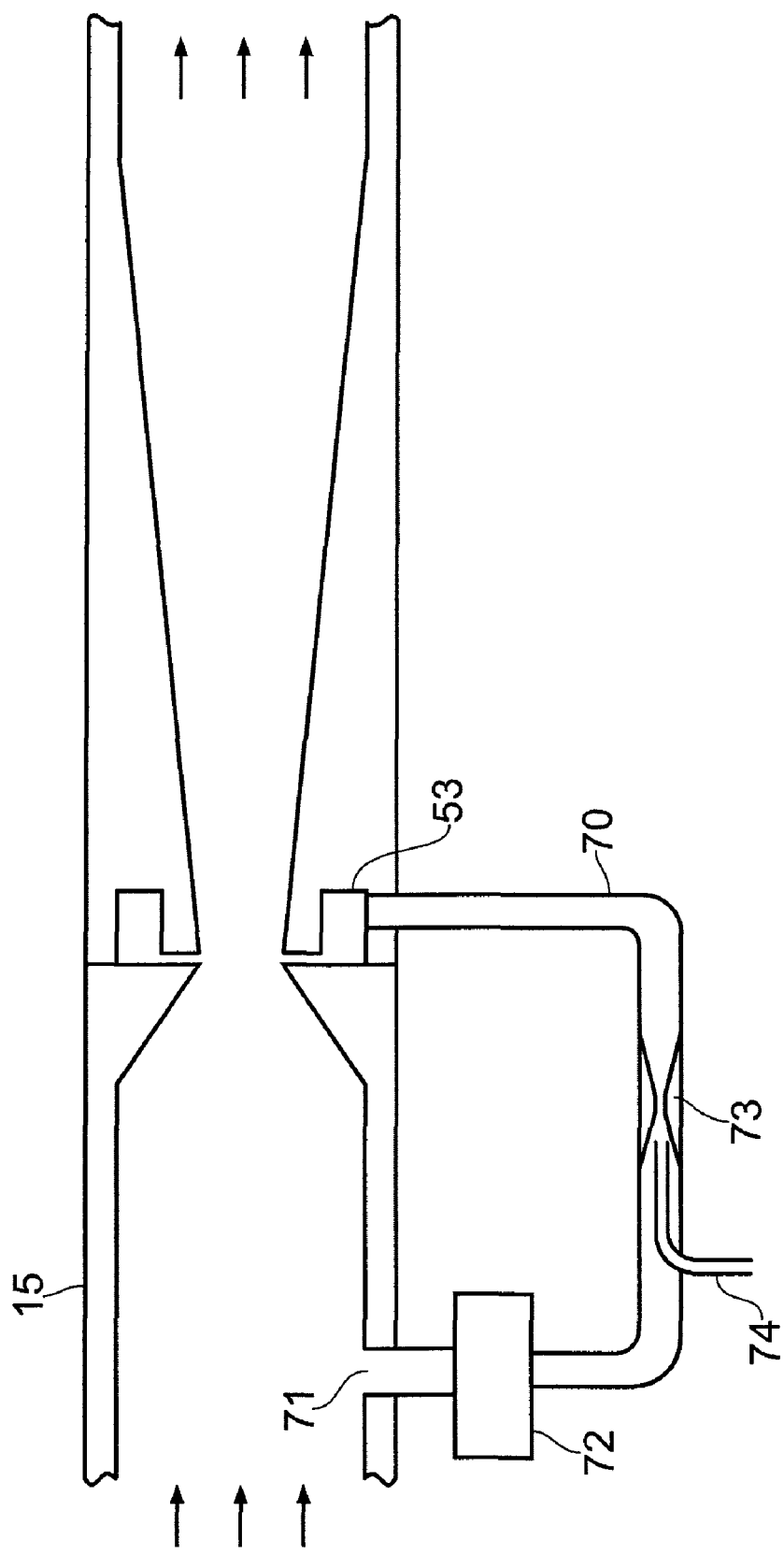
FIG. 5 shows a venturi system with throat tapping and a second venturi.

FIG. 5 shows a double venturi system. A venturi identical to the venturi of FIG. 4 is formed in the fuel line 15, but with a larger diameter (of the order of 12-14 mm) at the throat. A shunt line 70 leads between an inlet hole 71 in the wall of the fuel line (upstream of the venturi) and the annular chamber 53. A screen/trap 72 is provided in the line 70. The venturi in the fuel line has a throat pressure of the order of 0.5 P1 (that is, approximately 12 psig when the main fuel tank 12 is turned off). This draws fuel from the inlet 71 (where the pressure is P1) along the line 70 into the chamber 53. A second venturi 73 is provided in the line 70, and a jet pipe 74 is positioned with its inlet (not shown) at the sump of the wing tank 11 and its outlet positioned upstream of the venturi 73. The pressure at the throat of the venturi 73 is at or slightly below the pressure in the wing tank 11 (approximately 0 psig) in order to suck the water/fuel mixture into the line 70. Thus in the double venturi arrangement of FIG. 5, the work is done by two venturis running in parallel, enabling the venturi in the main fuel line 15 to be less narrow than the single venturi shown in FIG. 4.

In an alternative double venturi embodiment (not shown) the jet pipe 74 may be replaced by a throat-coupled arrangement similar to the throat coupling between the line 70 and the venturi in the line 15.

Figure 6:
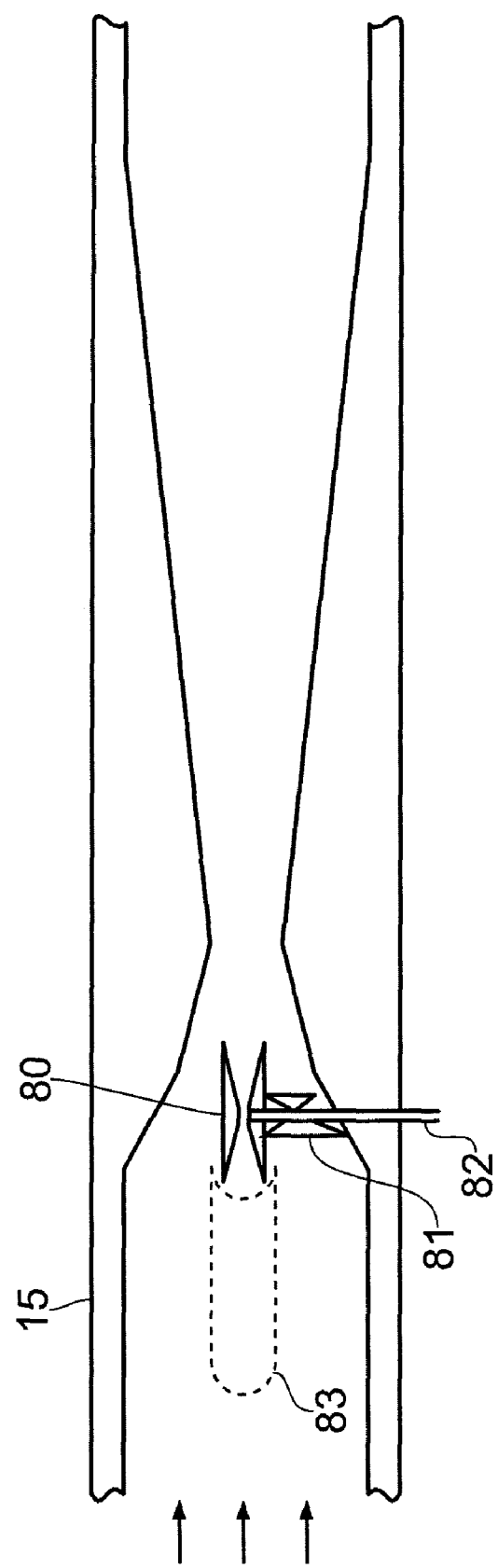
FIG. 6 shows a venturi system with an integral double venturi with throat tapping.

FIG. 6 shows an integral double venturi with throat tapping. An integral venturi 80 is positioned upstream of the main venturi in the fuel line 15. The venturi 80 is mounted to the fuel line 15 by a support structure 81. Fuel flows through the venturi 80, and through the annular gap between the venturi 80 and the fuel line 15. A line 82 is positioned with its inlet (not shown) at the sump of the wing tank 11 and its outlet coupled to the throat of the venturi 80. A filter 83 prevents the venturi 80 from being blocked by particulate material.

Figure 7:
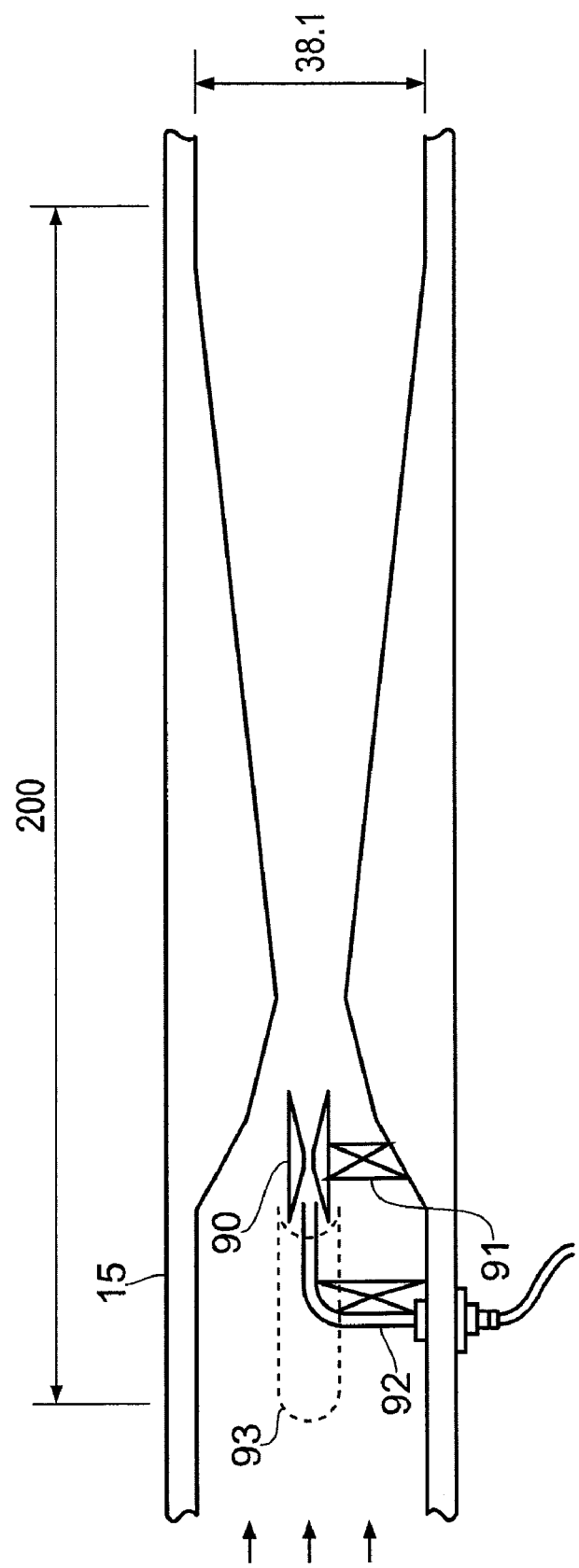
FIG. 7 is a venturi system showing an integral double venturi with jet pipe.

FIG. 7 shows an integral double venturi with a jet pipe. An integral venturi 90 is positioned upstream of the main venturi in the fuel line 15. The venturi 90 is mounted to the fuel line 15 by a support structure 91. Fuel flows through the venturi 90, and through the annular gap between the venturi 90 and the fuel line 15. A jet pipe 92 is positioned with its inlet (not shown) at the sump of the wing tank 11 and its outlet upstream of the throat of the venturi 80. A filter 93 prevents the venturi 90 from being blocked by particulate material.

Figure 8A:
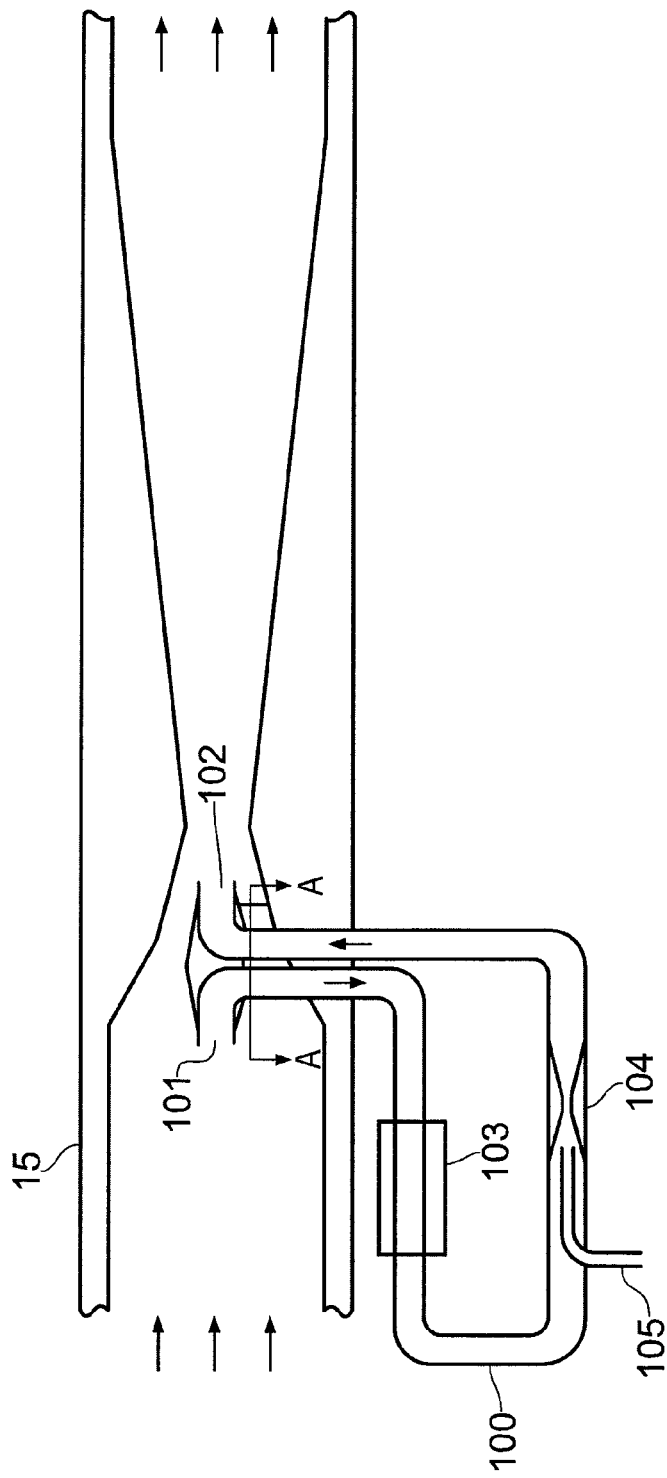
FIG. 8a shows a venturi system with jet pipe and a second venturi.
Figure 8B:
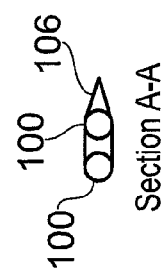

FIGS. 8a and 8b show a further embodiment. A line 100 leads between an inlet 101 upstream of the venturi in the fuel line 15, and an outlet 102 also upstream of the venturi in the fuel line 15. A 3 mm screen/trap 103 is provided in the line 70. The venturi effect draws fuel from the inlet 101 along the line 100 to the outlet 102. A second venturi 104 is provided in the line 100, and a jet pipe 105 is positioned with its inlet (not shown) at the sump of the wing tank 11 and its outlet positioned upstream of the venturi 104 as shown. FIG. 8b shows a section through the line 100. The line 100 is carried by a support structure (not shown in FIG. 8a) with a tapered upstream edge 106.

In an alternative embodiment (not shown) the jet pipe 105 may be replaced by a line which is coupled to the throat of the venturi 104.

The venturi-driven water scavenging systems shown in FIGS. 4 to 8 are all entirely automatic and powered by the hydraulic action of fuel in the fuel line. As a result no electrical power or data lines need to be routed into the fuel tank for the water scavenging system.

In the various embodiments described above, the water scavenging system introduces water into the fuel line at a junction 39 downstream of the pumps 20 and 21. In alternative embodiments (not shown) the water scavenging system may introduce water into the fuel line 15 at a junction upstream of the pump 20 and/or upstream of the pump 21.

The centre tank 10 may have a water-scavenging system (not shown) of the kind described in U.S. Pat. No. 4,809,934 or of the kind described above with reference to FIGS. 1 to 8.

Note that the fuel in the fuel tank comprises a single-phase fuel. Also, the inlet of the water scavenging line is immersed in a pool of water which has a relatively low volume compared with the volume of fuel in the tank. Thus the water scavenging line collects water from the pool during a first phase and collects fuel during a second phase when substantially all of the pool of water has been removed.

Although the invention has been described above with reference to one or more preferred embodiments, it will be appreciated that various changes or modifications may be made without departing from the scope of the invention as defined in the appended claims.

The invention claimed is:

1. A fuel system comprising: a fuel line; a fuel pump having an inlet coupled to a fuel tank and an outlet coupled to the fuel line; and a water scavenging system having an inlet for collecting water from the fuel tank and an outlet coupled to the fuel line in parallel with the pump.

2. The fuel system of claim 1 wherein the water scavenging system is powered by the hydraulic action of fuel in the fuel line.

3. The fuel system of claim 2 wherein the water scavenging system comprises a constriction in the fuel line, and the outlet of the water scavenging system is located adjacent to the constriction whereby the hydraulic action of fuel in the fuel line draws the water into the fuel line by the venturi effect.

4. The fuel system of claim 3 wherein the outlet of the water scavenging system comprises an opening in the constriction in the fuel line.

5. The fuel system of claim 3 wherein the opening in the constriction in the fuel line extends around the circumference of the constriction.

6. The fuel system of claim 3 wherein the water scavenging system further comprises:
a secondary venturi line having an inlet coupled to the fuel line, a constriction, and an outlet which forms the outlet of the water scavenging system; and
a water scavenging line having an inlet for collecting water and an outlet located adjacent to the constriction in the secondary venturi line whereby the hydraulic action of fuel in the secondary venturi line draws the water into the secondary venturi line by the venturi effect.

7. The fuel system of claim 6 wherein the secondary venturi line passes through a wall of the fuel line.

8. The fuel system of claim 6 wherein the outlet of the water scavenging line comprises a jet pipe which extends into the secondary venturi line.

9. The fuel system of claim 2 wherein the water scavenging system comprises:
a water scavenging pump; and
a motor having a power output coupled to the water scavenging pump and a fluid inlet coupled to the fuel line whereby the motor is powered by the hydraulic action of fuel drawn from the fuel line.

10. The fuel system of claim 1 wherein the fuel pump further comprises a re-circulating outlet.

11. The fuel system of claim 10 wherein the re-circulating outlet opens into the fuel tank.

12. A method of removing water from a fuel tank, the method comprising scavenging the water from the fuel tank; injecting it into a fuel line downstream of a fuel pump; and feeding it from the fuel line into an engine.

* * * * *